No. 746,256. PATENTED DEC. 8, 1903.
R. BAGGALEY.
APPARATUS FOR PRECIPITATING INJURIOUS FUMES FROM SMELTER GASES.
APPLICATION FILED AUG. 25, 1903.
NO MODEL. 6 SHEETS—SHEET 1.

WITNESSES
INVENTOR

No. 746,256. PATENTED DEC. 8, 1903.
R. BAGGALEY.
APPARATUS FOR PRECIPITATING INJURIOUS FUMES FROM SMELTER GASES.
APPLICATION FILED AUG. 25, 1903.
NO MODEL. 6 SHEETS—SHEET 2.

Fig. 2.

WITNESSES
INVENTOR
Ralph Baggaley
by Bakewell & Byrnes
his attys

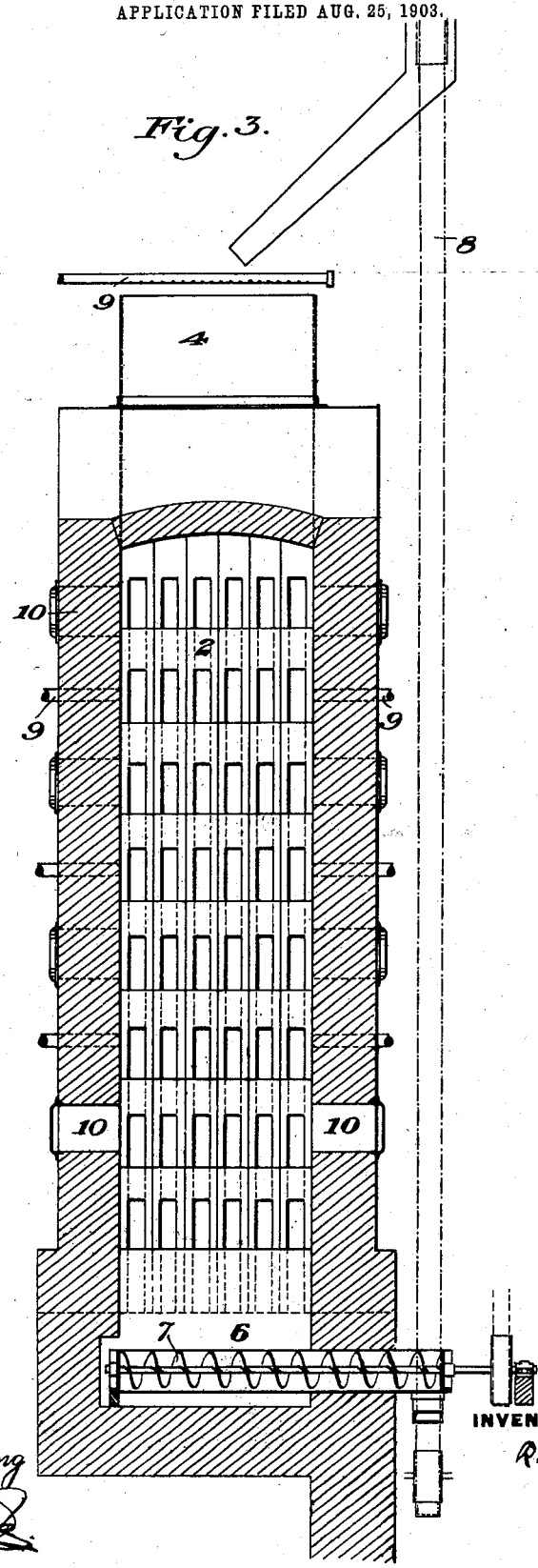

No. 746,256. PATENTED DEC. 8, 1903.
R. BAGGALEY.
APPARATUS FOR PRECIPITATING INJURIOUS FUMES FROM SMELTER GASES.
APPLICATION FILED AUG. 25, 1903.
NO MODEL. 6 SHEETS—SHEET 4.

WITNESSES
INVENTOR

No. 746,256. PATENTED DEC. 8, 1903.
R. BAGGALEY.
APPARATUS FOR PRECIPITATING INJURIOUS FUMES FROM SMELTER GASES.
APPLICATION FILED AUG. 25, 1903.
NO MODEL. 6 SHEETS—SHEET 5.
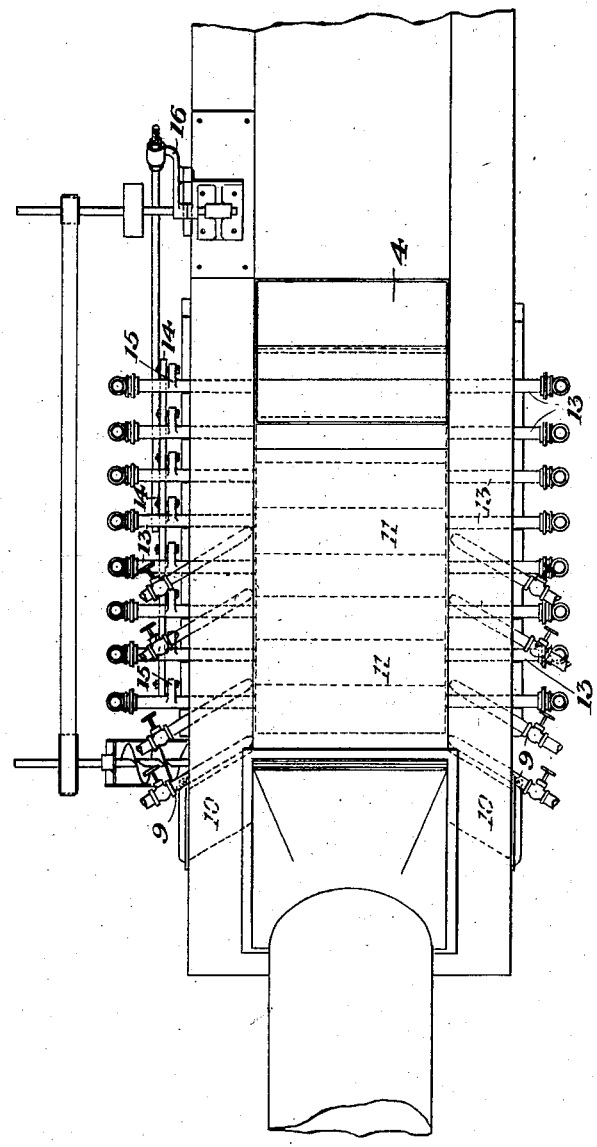
WITNESSES
INVENTOR No. 746,256. PATENTED DEC. 8, 1903.
R. BAGGALEY.
APPARATUS FOR PRECIPITATING INJURIOUS FUMES FROM SMELTER GASES.
APPLICATION FILED AUG. 25, 1903.
NO MODEL. 6 SHEETS—SHEET 6.

WITNESSES
INVENTOR

No. 746,256. Patented December 8, 1903.

UNITED STATES PATENT OFFICE.

RALPH BAGGALEY, OF PITTSBURG, PENNSYLVANIA.

APPARATUS FOR PRECIPITATING INJURIOUS FUMES FROM SMELTER-GASES.

SPECIFICATION forming part of Letters Patent No. 746,256, dated December 8, 1903.

Application filed August 25, 1903. Serial No. 170,725. (No model.)

*To all whom it may concern:*

Be it known that I, RALPH BAGGALEY, of Pittsburg, Allegheny county, Pennsylvania, have invented a new and useful Apparatus for Precipitating Injurious Fumes from Smelter-Gases, of which the following is a full, clear, and exact description, reference being had to the accompanying drawings, forming part of this specification, in which—

Figure 1:
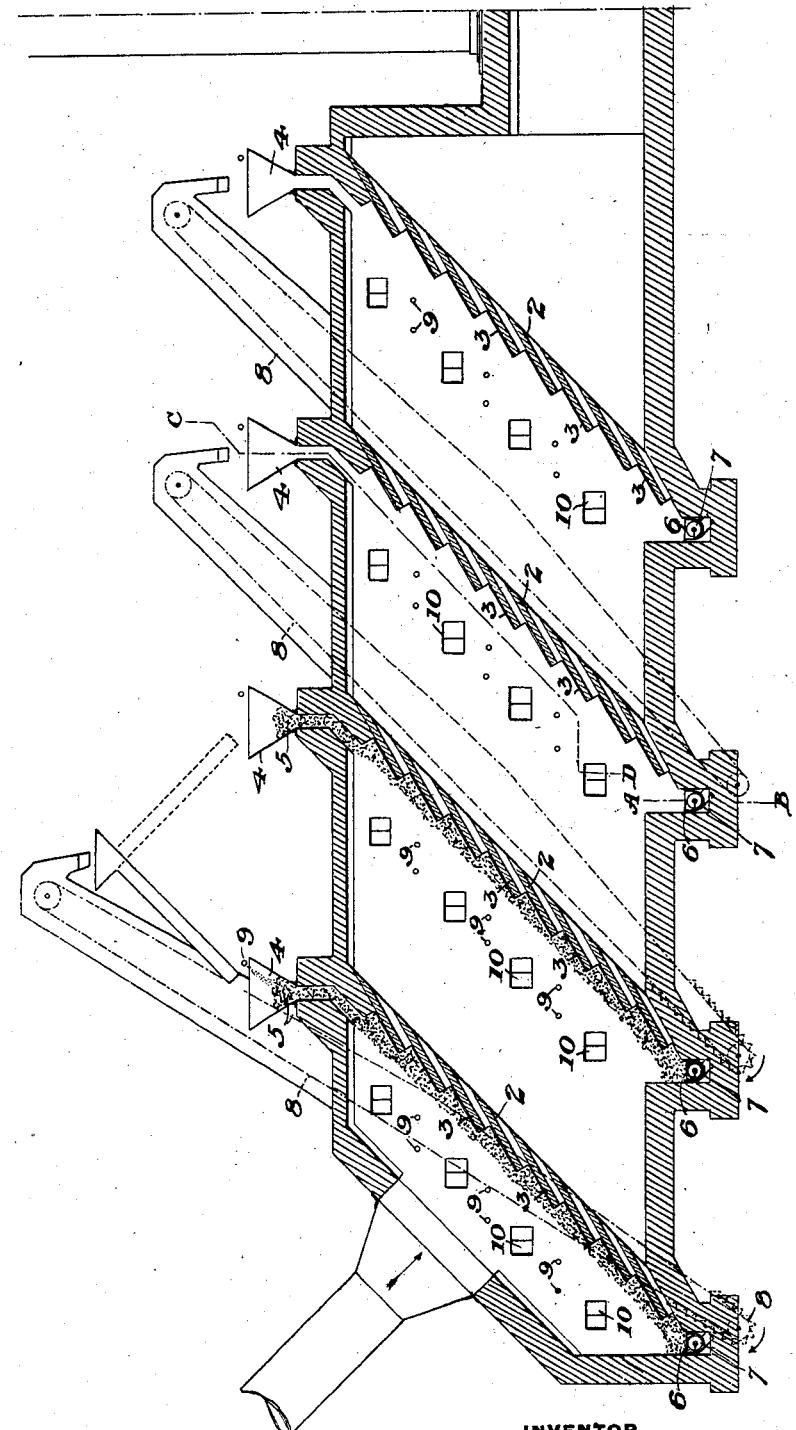
Figure 6:
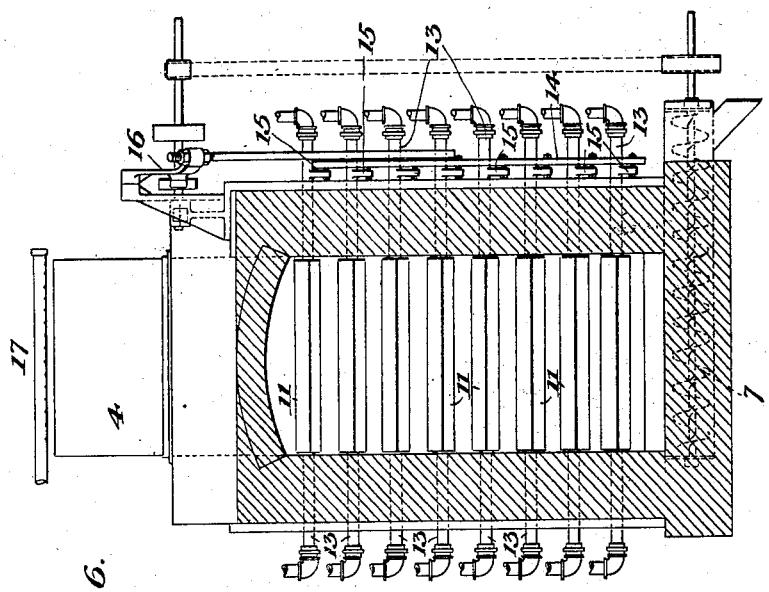

Figure 1 is a vertical section of the preferred form of my apparatus. Fig. 2 is a plan view thereof. Fig. 3 is a cross-section on the line C D A B of Fig. 1. Fig. 4 is a side elevation in section of a modified construction of my apparatus. Fig. 5 is a plan view thereof, and Fig. 6 is a cross-section on the line A B of Fig. 4.

My invention relates to an apparatus whereby the obnoxious and injurious gases contained in the fumes from smelters may be precipitated with the greatest economy, utilizing as filters and precipitating-surfaces a non-inflammable material that is abundant and cheap wherever smelting plants exist.

The problem of thoroughly precipitating the metals and metalloids contained in furnace-gases and at the same time catching and holding the flue-dust in suitable form to be used again is intricate and difficult.

The object of my present invention is to provide an apparatus that shall include the following desirable features: The work must be done throughout by machinery. The filtering material must be cheap and abundant wherever smelting plants exist and must be non-inflammable. This material after receiving its burden of precipitated metals and metalloids from the furnace-gases must not require removal to remote dumping-grounds because of the expense which such removal entails. The expense of removing incrustations and precipitated material from flues, flue-walls, and water-pipes must be avoided. The flue-dust must be caught and its values recovered without expense beyond that incident to ordinary smelter practice. Injurious substances must be thoroughly eliminated from the furnace-gases, so that when the latter escape into the atmosphere they shall be harmless. The expense of removing incrusted material from the flue-walls and water-pipes must be avoided.

I have found that the metals and metalloids contained in the furnace-gases when precipitated on the walls form a material consisting principally of iron and sulfur, but also containing arsenic, antimony, and many other things, regulated, of course, by the constituents of the ores under treatment. This material I have found to be very hard and impervious. At times it is almost as hard as iron and when precipitated upon the water-pipes and interior flue-walls is always difficult and expensive to remove, as well as injurious to the flue-walls to dislodge.

By interposing one or more filtering-surfaces, which are constantly kept moist, in the flue of a smelting-furnace subject to the draft of an ordinary stack or to an induced draft the free sulfur, sulfur dioxid, a portion of the arsenic, together with the antimony, lead, &c., will be precipitated upon such surface or surfaces, and the fumes may thereafter be allowed to escape into the atmosphere without injury to vegetation and without polluting the water of the district. The flue-chamber is preferably of sufficient length to contain four screens. The first screen is intended especially to accomplish the complete recovery of the flue-dust in such manner that it can be smelted and the values contained in it recovered without involving additional expense for treatment. This result is accomplished by using on the first screen materials which can be had at all copper-smelting plants and which contain sufficient values to necessitate re-treatment for their recovery and to prevent undue waste. Among these materials may be mentioned matte, converter-slags, &c. Any such material is suitable for use in this first screen. In addition to such products of the smelting plant containing values, and thus demanding re-treatment, certain ores may be used to advantage. Many sulfid ores, and especially pyrrhotite ores, will be found suitable for this purpose because of their firm nature and their non-liability to pack and to prevent the rapid passage of the furnace-fumes through the screen.

The preferred form of my apparatus (shown in Figs. 1 to 3) is as follows: At the end of the downtake from the furnace and in a position close enough to the furnace to admit of the gases and the flue-dust being received in a very hot state I place in a chamber 2 a screen or succession of screens, each consisting of a series of tile steps 3 3, spaced far enough apart to permit the ready passage between them of the fumes from the furnace in their flight to the stack. They are placed preferably at an angle of forty-five degrees. On top of the flue-chamber and immediately above the top step of the series is a hopper 4, so arranged that it will feed the broken filtering material 5 so that such material will readily flow by gravity over the steps in an unbroken layer from one side wall to the other and down to the bottom of the flue-chamber, at which point is a suitable hopper 6, so designed that all of such material must pass by gravity into it. Underneath this lower hopper is a screw conveyer 7 or equivalent device for the removal of the material after it has become fouled from the precipitated impurities. The material is then delivered onto a suitable conveyer-elevator 8 or similar device, by which the material of the first screen is elevated again to the feed-hopper 4 for repassage through the chamber, and from the lower hoppers of the subsequent screens the elevator preferably delivers the fouled material into railroad-cars or into wagons for removal. As each screw conveyer below the flue-chamber moves slowly by machinery the fouled slag material will be removed to a certain extent from the bottom hopper, and the cracked slag or other material above thus losing its support will move downward over the tile steps and ultimately into the lower hopper, whence it in turn will be expelled by the screw conveyer. As the material thus slides down the steps new material constantly enters from the hopper above, and thus the screen is constantly maintained throughout and over the entire inside area of the flue of a uniform thickness and in condition to perform the work intended. A spraying of water from nozzles 9 is maintained over the screen material, and these nozzles are shielded within holes in the walls for the purpose stated below.

In order to force the flue-dust and the metals or metalloids contained in the gases to precipitate upon the moving screens, the gases must be very hot when they come into contact with the screens, and an abundant and a continuous spraying of water over the entire surface of the screens must be maintained. The gases being very hot, the evaporation will be rapid, and to insure successful precipitation of the metals or metalloids such rapid evaporation must be compensated for and the faces of the screens must at all times be kept wet or at least moist. As the quantity of matte or converter-slags at any smelting plant is comparatively limited, the provision above described for passing such material repeatedly through the first screen is of practical value. When desired, the material after having been passed once or oftener through the apparatus may be removed therefrom and re- treated in a blast-furnace or reverberatory furnace or in other suitable smelting or reducing apparatus. The utilization of material containing metallic values for collecting the flue-dust and enabling it to be returned to a smelting-furnace I regard as broadly new. The second, third, and fourth screens are intended to thoroughly arrest and to precipitate any remaining metals or metalloids in the fumes before the ultimate discharge of these gases in a harmless condition into the atmosphere. On these screens I use, preferably, cracked refuse slag as free as possible from dust. The refuse slag from slag-heated boilers cracked into pieces of from one to three inches diameter is especially suited for this purpose, but if preferred broken stone, gravel, water-worn boulders, or any such non-inflammable material may be used. Such material after becoming foul with its burden of precipitated metals and metalloids may thereafter be utilized as filling in underground mine-workings, for which purpose the presence of the precipitated impurities is not objectionable. To arrest and precipitate all the arsenic from the furnace-fumes, it is necessary to use an alkaline solution or a dilute solution of sulfid of calcium on at least one of the filtering-screens, although a large proportion of the arsenic will be mechanically precipitated, together with the sulfur, iron, antimony, &c., by using water alone. Therefore on each screen I spray either water or an alkaline solution or a weak solution of sulfid of calcium. At most points where copper-smelters are located alkali water is available almost without cost, and this offers at once a cheap and a most excellent precipitant for any arsenic contained in the fumes. Inasmuch as the arsenic in such gases is the most poisonous and by far the most injurious of the contained impurities to animal life, it is of importance that it should be eliminated from the gases before they are permitted to escape into the atmosphere. As the cracked slag or other non-inflammable material enters the hopper above it is copiously sprayed with water or with an alkaline solution, which passes down into the flue-chamber with it. The natural tendency of this liquid will be to seek the lowest level by the action of gravity. Hence it will trickle down over the tile steps in a continuous stream, and it will in this position intercept and precipitate very rapidly the metals and metalloids on the faces of the slag. It is also obvious that this precipitation will occur upon the tile steps themselves, which in a measure at least will compensate for the wear due to the cutting and the grinding of the slag in its downward passage to the hopper below.

If it is desired to precipitate the impurities contained without regard to the recovery of the flue-dust, common cracked slag may be used to advantage in the first screen and the apparatus so arranged that the elevator shall reconvey it from the bottom of the first screen into the top hopper of the second screen. From the bottom of the second screen the material is then delivered into the hopper of the third screen, and thence in the same manner into the fourth. Thus the slag will pass through the four screens and will receive four successive coatings of precipitates.

The following points of advantage will be noted by those skilled in the art: In an ordinary smelting-furnace having a capacity of three hundred and sixty tons of ore in twenty-four hours and which ore may contain twenty per centum of sulfur, it will be necessary to precipitate from the fumes daily at least fifty or seventy-five tons of impurities, according to the character of the ore under treatment. In other words, over one-fifth of these three hundred and sixty tons of ore will surely escape every day into the atmosphere in the form of sublimated metals or metalloids. It is probable that such a furnace will sometimes throw off in gases a total of one hundred tons in twenty-four hours, or approximately four tons per hour, or one ton in every fifteen minutes, or, say, one hundred and twenty-five pounds per minute. The necessity for screens or for precipitating-surfaces actuated solely by machinery or by gravity will be apparent to those skilled in the art. The urgent need, too, of preventing the devastating effects to the country surrounding a smelter plant from the daily escape of such vast quantities of poisonous impurities will be apparent.

Owing to the design and the manner in which the water-jets are delivered, it is impossible for precipitation to occur on the water-pipes or on the flues or on the side walls of the apparatus or, in point of fact, on anything but the sliding screen material intended for its reception, with the exception of the tile steps, where such precipitation is desired and where it is a benefit. Exposed pipes for the delivery of the water or alkaline solution upon the screen are dispensed with, and the jets of water are delivered from the nozzles concealed in and protected by the side walls of the flue-chamber.

As before stated, the precipitation on and the consequent incrustation of the screen are at times astonishingly rapid. For this reason it is possible that at times when certain classes of ore containing large percentages of impurities are being smelted that the screen material may become so coated with incrustations as to cause it to clog, and thus prevent it from flowing downward over the slides and into the lower hopper and onto the screw conveyer, as intended. To guard against this contingency, I provide a succession of doors or peep-holes 10, so that the condition of any screen at any point and at any time may be quickly examined, and, if necessary, any serious incrustations or obstructions can thus be corrected by the operator in charge.

The modified apparatus (shown in Figs. 4 to 6) is similar in many respects to that hereinbefore described. the features of difference are the following: In lieu of tile steps built permanently into the brick side walls at an angle of approximately forty-five degrees in this alternative device I employ hollow steps 11, made, preferably, of brass mounted at each end on trunnions 13, projecting through the walls. These metal steps can be oscillated through a short arc by a reciprocating rod 14 on the outside of the flue-chamber, the object of this being to break up any incrustations on the screen material and to thus cause such material to flow steadily downward by gravity. The rod 14 is connected to a lever 15 on the trunnion on each step and is operated by a rocking arm 16 or other power-driven device, so that the rod will be reciprocated slowly. The metal steps are cooled, and thus protected from the hot gases by water, which enters the trunnion at one end and escapes from the trunnion at the other end. The water-jets in this modification are like that of the construction above described. The water-supply is derived from a pipe 17 above the top hopper, from which many jets play down upon the slag as it enters the flue-chamber, and from nozzles at as many points on each side of the flue-chamber as may be desired, two or more jets being set into the side wall at such angles as to completely moisten the entire surface of each screen from its top to the bottom hopper. In this manner the passing gases will be forced to come into contact with thoroughly-moistened precipitating-surfaces and will be compelled to drop their burden of metals and metalloids before they are permitted to reach the stack and to escape into the outer atmosphere.

Within the scope of my invention the apparatus may be otherwise modified in many ways, since

What I claim is—

1. Apparatus for filtering gases, comprising a chamber for the passage of the gases, and an inclined surface therein supporting a filtering body composed of pieces of solid material; substantially as described.

2. Apparatus for filtering gases, comprising a chamber for the passage of the gases, and an inclined surface therein supporting a filtering body composed of pieces of solid material, said surface having inclined gas-passages; substantially as described.

3. Apparatus for filtering gases, comprising a chamber for the passage of the gases, and an inclined surface therein for a body of filtering material, said surface being stepped; substantially as described.

4. Apparatus for filtering gases, comprising a chamber for the passage of the gases, and an inclined surface therein for a body of filtering material, said surface being stepped and having gas-passages between the steps; substantially as described.

5. Apparatus for filtering gases, comprising a chamber for the passage of the gases, and an inclined surface therein for a body of filtering material, and a water-supply discharging upon the material on said surface; substantially as described.

6. Apparatus for filtering gases, comprising a series of columns of filtering material having feeding-openings at the upper end, and a conveyer leading from the lower end of one column to the receiving-opening of another column; substantially as described.

7. Apparatus for filtering gases, comprising a series of columns of filtering material having feeding-openings at the upper end, and a screw conveyer for removing the material at the base of one column, and an elevating-conveyer for delivering it to the feeding-opening of another column; substantially as described.

8. Apparatus for filtering gases, comprising a chamber for the passage of the gases, and an inclined surface therein for a body of filtering material, said surface being composed of a series of movable supports; substantially as described.

9. Apparatus for filtering gases, comprising a chamber for the passage of the gases, and an inclined surface therein for a body of filtering material, said surface being composed of a series of movable supports arranged in stepped form; substantially as described.

10. Apparatus for filtering gases, comprising a chamber for the passage of the gases, and an inclined surface therein for a body of filtering material, said surface being composed of a series of movable supports arranged in stepped form and water-cooled; substantially as described.

11. Apparatus for filtering gases, comprising a chamber for the passage of the gases, and an inclined surface therein for a body of filtering material, said surface being composed of a series of movable supports arranged in stepped form, and rocking mechanism therefor; substantially as described.

In testimony whereof I have hereunto set my hand.

RALPH BAGGALEY.

Witnesses:
WILLIAM M. KIRKPATRICK,
W. D. KYLE.